(12) United States Patent
Bozarth

(10) Patent No.: US 9,280,652 B1
(45) Date of Patent: Mar. 8, 2016

(54) SECURE DEVICE UNLOCK WITH GAZE CALIBRATION

(71) Applicant: Amazon Technologies, Inc., Reno, NV (US)

(72) Inventor: Bradley J. Bozarth, Sunnyvale, CA (US)

(73) Assignee: Amazon Technologies, Inc., Reno, NV (US)

( * ) Notice: Subject to any disclaimer, the term of this patent is extended or adjusted under 35 U.S.C. 154(b) by 185 days.

(21) Appl. No.: 14/091,245

(22) Filed: Nov. 26, 2013

Related U.S. Application Data

(63) Continuation of application No. 13/076,308, filed on Mar. 30, 2011, now Pat. No. 8,594,374.

(51) Int. Cl.
*G06K 9/00* (2006.01)
*G06F 21/36* (2013.01)

(52) U.S. Cl.
CPC ..................................... *G06F 21/36* (2013.01)

(58) Field of Classification Search
CPC ...................................................... G06K 9/00
USPC ....................................................... 382/103
See application file for complete search history.

(56) References Cited

U.S. PATENT DOCUMENTS

| | | | | |
|---|---|---|---|---|
| 6,664,965 | B1* | 12/2003 | Yamamoto et al. | 345/473 |
| 7,986,816 | B1* | 7/2011 | Hoanca et al. | 382/115 |
| 2004/0061831 | A1* | 4/2004 | Aughey et al. | 351/209 |
| 2005/0270386 | A1 | 12/2005 | Saitoh et al. | |
| 2007/0092115 | A1* | 4/2007 | Usher et al. | 382/117 |
| 2009/0083847 | A1* | 3/2009 | Fadell et al. | 726/16 |
| 2009/0313476 | A1* | 12/2009 | Liu et al. | 713/182 |
| 2009/0316025 | A1* | 12/2009 | Hirai | 348/273 |
| 2012/0243729 | A1* | 9/2012 | Pasquero | 382/103 |

OTHER PUBLICATIONS

Baluja et al.; "Non-Intrusive Gaze Tracking Using Artificial Neural Networks", Advances in Neural Information Processing Systems, Jan. 5, 1994.
Non-Final Office Action mailed Apr. 24, 2013; in corresponding U.S. Appl. No. 13/076,308.
Notice of Allowance and Fee9s) Due mailed Aug. 7, 2013; in corresponding U.S. Appl. No. 13/076,308.

* cited by examiner

*Primary Examiner* — Stephen R Koziol
*Assistant Examiner* — Delomia L Gilliard
(74) *Attorney, Agent, or Firm* — Novak Druce Connolly Bove + Quigg LLP

(57) ABSTRACT

An unlock procedure for an electronic device can be based at least in part upon a determined gaze direction or viewing location of a user. During a device unlock process, the user can be directed to follow an element or path on a display element with the user's eyes. Image information captured of the user during this process can be used to correlate the user's eye position in the image with the corresponding gaze location on the device, in order to calibrate the gaze tracking in a way that is substantially transparent to the user. Further, certain devices can also utilize captured image information during the unlock process to authenticate the user using a process such as iris recognition or retinal scanning. Such an approach enables secure access to the device without requiring the user to manually enter identifying information, and re-authentication can be performed without distracting the user.

20 Claims, 8 Drawing Sheets

SECURE DEVICE UNLOCK WITH GAZE CALIBRATION

CROSS-REFERENCES TO RELATED APPLICATIONS

This application is a continuation of U.S. patent application Ser. No. 13/076,308, entitled "Secure Device Unlock With Gaze Calibration," filed Mar. 30, 2011, and issuing as U.S. Pat. No. 8,594,374, which is hereby incorporated by reference for all purposes.

BACKGROUND

People are increasingly relying upon electronic devices to access various types of content, much of which can be confidential or otherwise sensitive to the user. For example, a user might store a list of personal contact information on an electronic device, or might install an application that provides access to that user's bank accounts. Accordingly, it can be desirable to protect against unauthorized access to a device. In many instances, such protection requires a user to enter a password or other identifying information each time that user wants to access the device. For many users such repetitive validation can be distracting or even annoying.

Further, once a user is validated using a password, for example, other people can access information on that device as long as the device is not re-locked. For example, a user might enter a password into a device and then step away from the device. If the device has a timeout period before the device goes into a lock mode, any person grabbing the device in the meantime can access that information. Thus, conventional security mechanisms must balance between user frustration at constantly entering identifying information and the level of protection for a given device.

BRIEF DESCRIPTION OF THE DRAWINGS

Various embodiments in accordance with the present disclosure will be described with reference to the drawings, in which.

DETAILED DESCRIPTION

Figure 1:
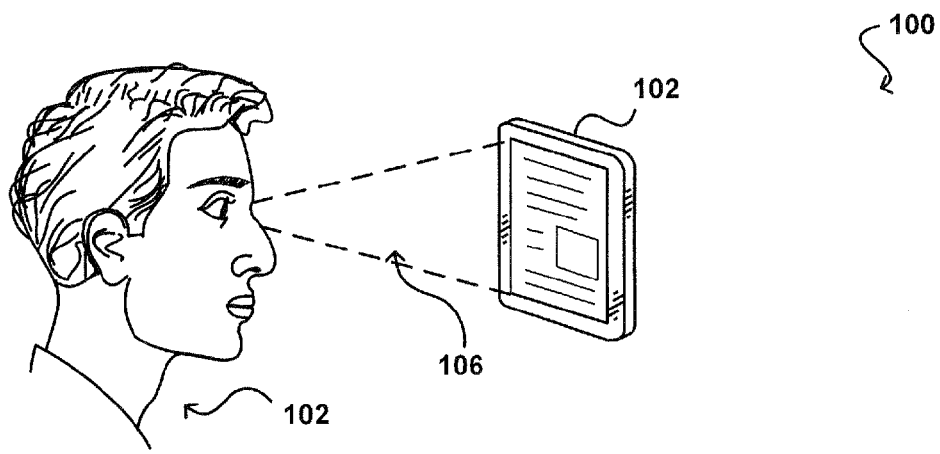
FIG. 1 illustrates an environment in which a user is able to glance at an electronic device to view information in accordance with various embodiments.

Systems and methods in accordance with various embodiments of the present disclosure may overcome one or more of the aforementioned and other deficiencies experienced in conventional approaches to enabling a user to interact with, or control, a system, device, interface, or other such object or element in an electronic environment. Various embodiments enable a user to unlock an electronic device, or otherwise obtain access to functionality of that device, based at least in part upon a determined gaze direction of the user. The device can perform gaze calibration and/or user authentication during the unlock process in a way that is transparent to the user. Such an approach can provide secure access to the device without the need for the user to manually enter identifying information, and enables accurate gaze tracking without having the user repeatedly go through a dedicated calibration procedure (at least in certain situations).

In some embodiments, a graphical element such as a movable image or animated icon can be used to attract the user's gaze. The graphical element can be moved across a display element according to a determined pattern, and the user can unlock the device by following the element along the pattern with the user's gaze. If the pattern is selected to cover various points or distances on a display element, for example, the device can monitor the gaze direction of the user while following the pattern to obtain calibration information that can be extrapolated to substantially cover the full area of the display element under the current conditions. The pattern can be selected, rotated, or otherwise updated to prevent unauthorized access by a device, for example, or to get specific calibration information based upon the present orientation of the device with respect to the user, current lighting conditions, or other such factors.

The image information captured for gaze tracking and/or calibration (or additionally captured image information) can also be used to authenticate the user. For example, captured image information can be analyzed to locate areas corresponding to the user's eye(s). This information can be analyzed using a process such as retinal scanning or iris recognition in order to identify or authenticate the user. Access to the device can be contingent upon recognizing the user in at least some embodiments. In various embodiments, functionality of the device can also be modified, selected, or restricted based on an identity (or lack of determined identity) of the user.

In at least some embodiments, one or more wavelengths of infrared (IR) radiation can be used to capture image information of the user's eye(s). Based on absorption or other response characteristics, the device can determine that the image information being captured corresponds to an actual human eye, and is not a generated video or other such occurrence. Due to the reflection properties of the eye to IR radiation, for example, such an approach can also simplify the process for locating the user's eyes in the captured image information.

A device can also track changes in relative orientation between the user and the device over time and can adjust calibration information accordingly. If acceptable calibration is lost, the device might request that the user again perform an unlock-type gaze motion. If gaze is lost, the device also might re-verify the user's identity to ensure that another person is not obtaining unauthorized access to the device.

Various other applications, processes and uses are presented below with respect to the various embodiments.

FIG. 1 illustrates an example situation 100 wherein a user 102 is viewing content being displayed on a display element of an electronic device 102. While viewing the content on the device, the viewing angle or gaze direction will fall within a given range 106, where that range is relative depending upon factors such as movement of the user or device, etc. As the user is viewing content near the bottom of a page being displayed, the viewing angle will be near the bottom of that range. Similarly, while the user is viewing content near the top of that page the viewing angle will be near the top of that range. As will be discussed in more detail later herein, at least one imaging element of the device can capture image information of the user and analyze that information to determine a current gaze direction of the user within that range. The device then can accept input from the user based at least in part upon a current gaze direction and/or change in gaze direction of the user. For example, when the user's gaze reaches the bottom of a page of content being displayed, the device might scroll up the display of content to enable the user to view the next page. The gaze of a user can be used to control various other types of functionality, such as is described in co-pending U.S. patent application Ser. No. 12/332,049, filed Dec. 10, 2008, entitled "Movement Recognition as Input Mechanism," which is hereby incorporated herein by reference for all purposes.

When utilizing gaze input, however, there are a number of different factors that can affect the accuracy of the input. For example, the user might be a different distance from the device than during a previous session. Further, the user might be holding the device at a different angle, or there can be different lighting or viewing conditions. Any of a number of other factors might affect the accuracy as well. Accordingly, it can be desirable in at least some embodiments to calibrate the gaze input under the current conditions. It may be undesirable for many users, however, to have to go through a dedicated calibration procedure each time the user wants to access the device.

In certain conventional devices, a user can unlock a device by swiping a finger across a display screen and then entering a password or other identifying information. When the device is able to track the user's gaze, however, a similar motion could instead be performed by the user's gaze. For instance, the user could move or follow a graphical element across the screen with the user's eyes instead of the user's finger. Such an approach would have benefits such as enabling the user to unlock the device without having to be in physical proximity of the device and without smudging the screen or otherwise risking dirt or debris being moved across the screen. Further, such motion can be used to calibrate the gaze tracking in a way that is substantially transparent to the user.

Figure 2:
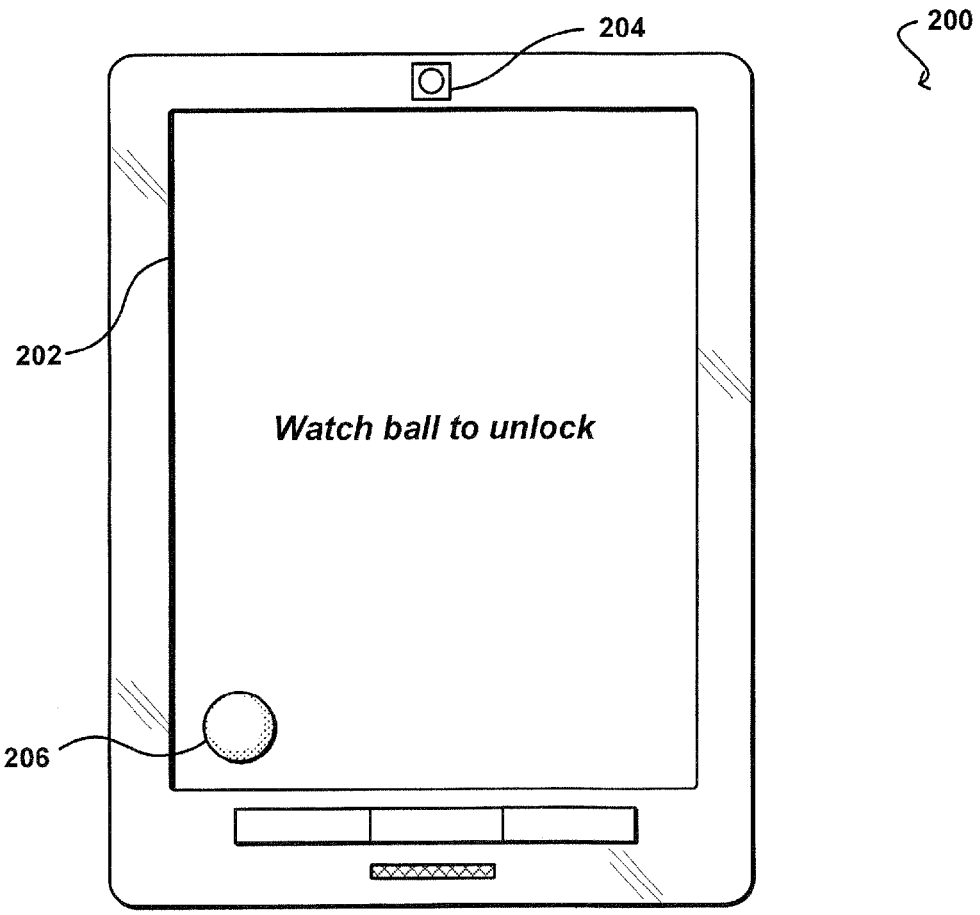
FIG. 2 illustrates an example interface enabling a user to unlock an electronic device that can be used in accordance with various embodiments.

FIG. 2 illustrates an example of such an interface that can be utilized in accordance with various embodiments. In this example, an electronic device 200 includes a display element 202 and at least one image capture element 204. The image capture element is positioned on the electronic device such that the element is likely able to capture information about a user viewing information displayed on the display element 202 of the device. As discussed in more detail elsewhere herein, the imaging element 204 can be configured to capture one or more images of a user viewing the display element 302 in order to determine a current gaze direction and/or viewing location of the user with respect to the display element (or other portions of the device). The display element in this example presents a message to the user asking the user to watch the virtual ball displayed on the device to unlock that device. When the user is reading the message, for example, the user's gaze will be directed substantially toward the middle of the display element to where the text is displayed. By determining where the user is relative to the device, and the relative position of a feature of the user's eyes (e.g., a retinal reflection or a pupil/iris position), an analysis of the image can provide an indication that the user it likely looking at that portion of the display when the eyes are in that relative orientation. A movement of the user's gaze direction towards the position of the graphical ball 206 can be detected in the image information as well, and the relative location of the user's eyes when looking at the ball can be utilized to determine the gaze direction of the user when looking at the position of the graphical ball. Such gaze movement can be used to provide at least some level of calibration of the gaze tracking of the device.

It may often be the case, however, that after the first time a user unlocks the device using gaze tracking, the user will no longer read the instructional text and will just look at the graphical ball (or other such element). Thus, there would only be one input or calibration point received when the user looks at the ball. Depending upon the relative orientation of the user and/or the capabilities of the gaze tracking algorithm, the device might not even be able to determine that the user is looking at the ball without other movement or data points to assist the algorithm.

Figure 3A:
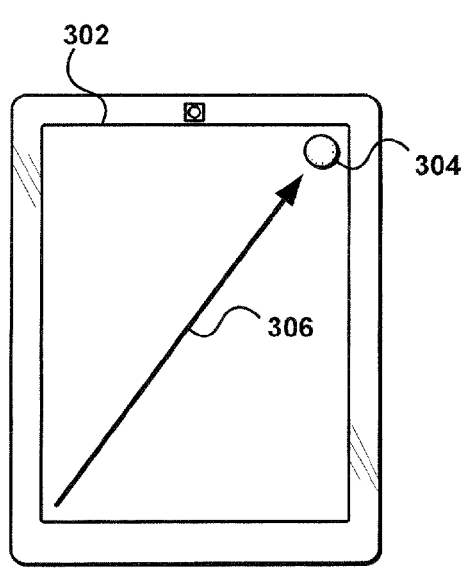
FIGS. 3(a) and 3(b) illustrate example patterns that can be used for gaze unlocking and calibration in accordance with various embodiments.

An approach in accordance with various embodiments utilizes motion, such as movement of a ball or other such graphical element, to assist in gaze determination. For example, FIG. 3(a) illustrates an example situation wherein a graphical ball 304 displayed on a display element 302 of an electronic device 300 follows a selected path 306. As discussed previously, swiping a graphical element across a screen using a touch control is an approach used by many users to unlock a conventional electronic device. In this example, the user can perform a similar action that can seem intuitive, as the user is still performing a swiping motion to unlock the device. In this case, however, the user can "swipe" or move the element using the user's gaze. An additional advantage is that the user's eyes will follow a matching trajectory in the images captured by the device such that the device 300 can more accurately determine when the user is gazing at the display element.

Further, the device can obtain calibration information for the user under the current conditions. For example, the path 306 in FIG. 3(a) goes substantially from one corner of the display element 302 to the other. Such a path is simple for the user to follow without much effort, but gives an indication of the range of movement of the user's eyes under the current conditions to cover approximately the entire area of the display element 302. For example, the amount of movement of the user's eyes in the captured images can vary substantially based at least in part upon the distance of the user from the device. The path can be shown if the user is to move the ball along the illustrated path, or can be hidden if the user is to instead follow the motion of the ball without knowing the path ahead of time. Further, the apparent movement in the captured images can change significantly based upon changes in orientation, such as when the user is holding the device directly in front or his or her face, or has the device on his or her lap on an airplane. Various other factors can affect calibration as well as should be apparent to one of ordinary skill in the art in light of the teachings and suggestions contained herein.

In at least some embodiments, it can be desirable to ensure that the device is being unlocked by a human. As will be discussed later herein with respect to eye recognition, a person or entity might attempt to obtain unauthorized access to an electronic device by playing a video file or otherwise generating image content that can be captured by the electronic device to attempt to unlock or otherwise gain access to the electronic device. For example, if a device unlocks using a specific pattern that does not change, that device could potentially be unlocked by displaying a video of a user with eye's following that path within view of the image capture element of the device.

Further, even actual users over time might try to unlock the device by quickly mimicking a standard pattern to unlock the device without actually following the displayed pattern. Such an approach might be sufficient to unlock the device, but if the movement is being used to calibrate the device then the gaze tracking might not work due to the erroneous calibration data captured during the unlock process.

Figure 3B:
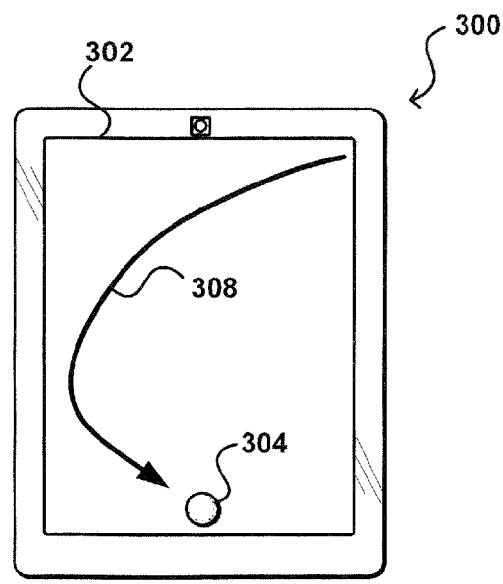

Accordingly, approaches in accordance with at least some embodiments can utilize multiple unlock patterns that can be randomly selected, rotated, or otherwise determined for use in unlocking the device. For example, FIG. 3(b) illustrates another pattern 308 that can be used to unlock the device in accordance with various embodiments. As can be seen, the pattern still provides the primary calibration information needed, namely the amount of eye travel needed to go substantially the full height and width of the display element. The pattern requires substantially different eye movements, however, and if this pattern was selected or generated at random, for example, it would be difficult for a device to predict the movement needed to follow the unknown trajectory of the ball. As mentioned, these patterns can be generated at random following a certain set of constraints, such as a maximum path length and a need to provide calibration information for the length and width of the display. In other embodiments, specific patterns can be used and/or selected as appropriate.

In some embodiments, specific patterns might be used under certain conditions. For example, if the device is at an oblique angle with respect to the user, the device might want to user a pattern that will capture more calibration information along one direction than the other, such as the difference in eye movement for the edge furthest from the user versus the edge nearest the user. Similarly, under low light conditions for ambient light gaze tracking the pattern might need to be more complex or run more slowly to capture more precise calibration data. Various other such factors can affect the calibration pattern selection and/or generation as well.

As mentioned above, using gaze tracking to unlock the device can also provide various devices with the ability to identify a user based upon the captured image information. For example, the captured image information can be used to identify features of the user's eyes, such as unique points on a user's iris or retina, that can be used to relatively unique identify that user. Such information can be used with the gaze-based unlock process to provide a secure unlock mechanism that does not require the physical or manual entry of identifying information such as a password or passcode. For example, if a person follows the ball according to the selected unlock pattern, but the captured image information upon analysis indicates that the person is not an authorized user of that device, then the device might not unlock for that person. In other cases, the device might unlock for an unauthorized or unrecognized person, but might not provide access to certain data, applications, or other such functionality.

Figure 4:
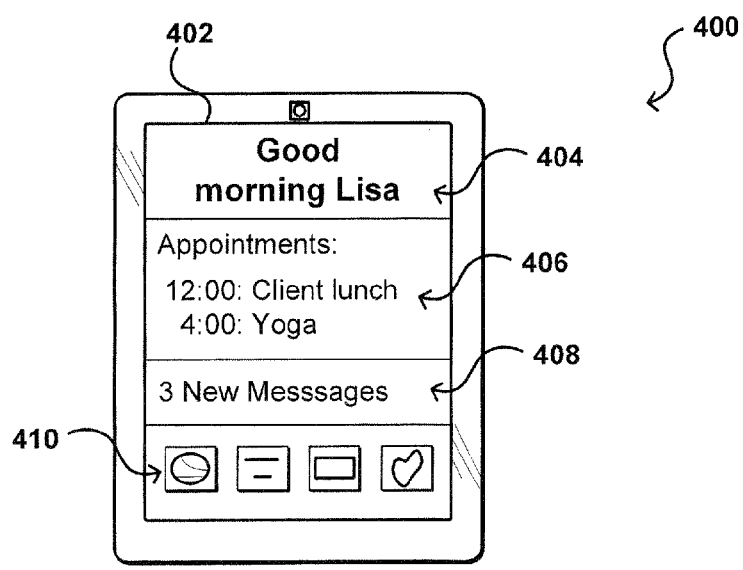
FIG. 4 illustrates an example personalized interface that can be presented to a user in response to a user identification in accordance with various embodiments.

Similarly, the ability to recognize a user enables the device to provide the user with any personalized content or functionality known or used for various devices in response to a user authentication. For example, FIG. 4 illustrates an example welcome screen that can be displayed on a display element 402 of an electronic device 400 in response to a user being recognized and/or authenticated as part of a gaze monitoring process in accordance with one of the various embodiments. In this example, the welcome screen displays a personalized message to the recognized user 404, as well as personalized information such as schedule information 406 and information indicating messages received for that user 408. The device can also display specific applications 410 or other elements or functionality selected by or otherwise associated with that user. Various other types of personalization can be utilized as well as known in the art and as would be apparent in light of the present disclosure, which will not be discussed herein in detail.

Such personalization can be used with other electronic devices as well. For example, a person watching television can have certain channels locked out or certain favorite channels updated based upon eye recognition. While a user might be too far away from a television in certain embodiments where the imaging element might not have sufficient resolution, in some embodiments a remote control device can have at least one image capture element operable to capture the eye information and transmit information to the television for personalization.

Figure 5:
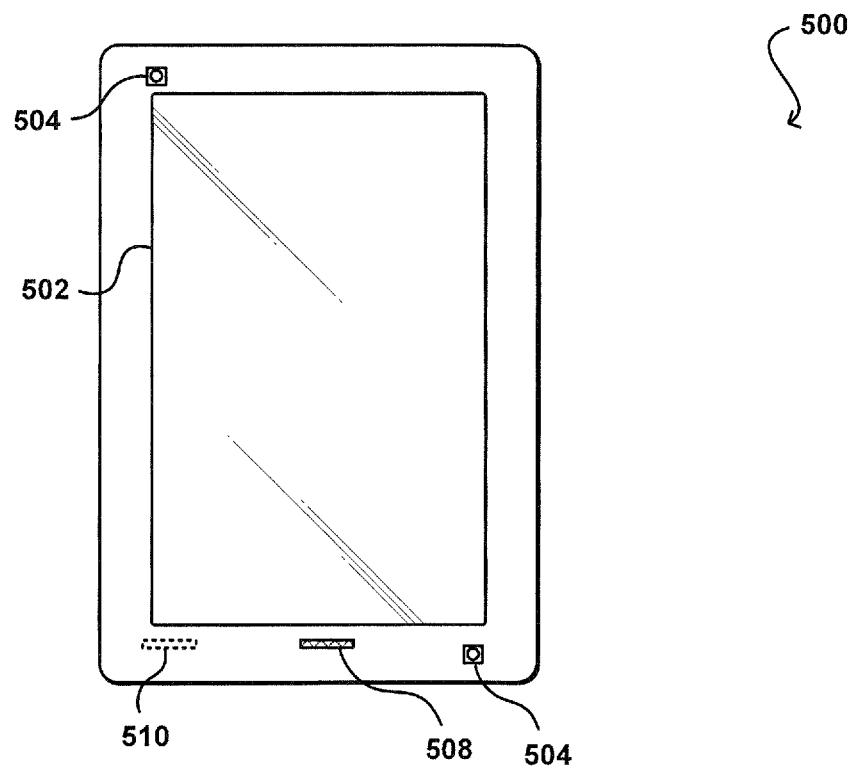
FIG. 5 illustrates an example computing device including elements operable to capture gaze information that can be used in accordance with various embodiments.

FIG. 5 illustrates an example of an electronic device 500 that can be used in accordance with various embodiments. Although a portable computing device (e.g., a smart phone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others.

In this example, the computing device 500 has a display screen 502, which under normal operation will display information to a user facing the display screen (e.g., on the same side of the computing device as the display screen). The computing device in this example can include one or more image capture elements, in this example including two image capture elements 504 on the front side of the device, although it should be understood that image capture elements could also, or alternatively, be placed on the sides or corners of the device, and that there can be any appropriate number of capture elements of similar or different types. Each image capture element 504 may be, for example, a camera, a charge-coupled device (CCD), a motion detection sensor, or an infrared sensor, or can utilize any other appropriate image capturing technology. The computing device can also include at least one microphone 508 or other audio capture element(s) capable of capturing other types of input data. At least one orientation-determining element 510 can be used to detect changes in position and/or orientation of the device. Various other types of input can be utilized as well as known in the art for use with such devices.

Figure 6:
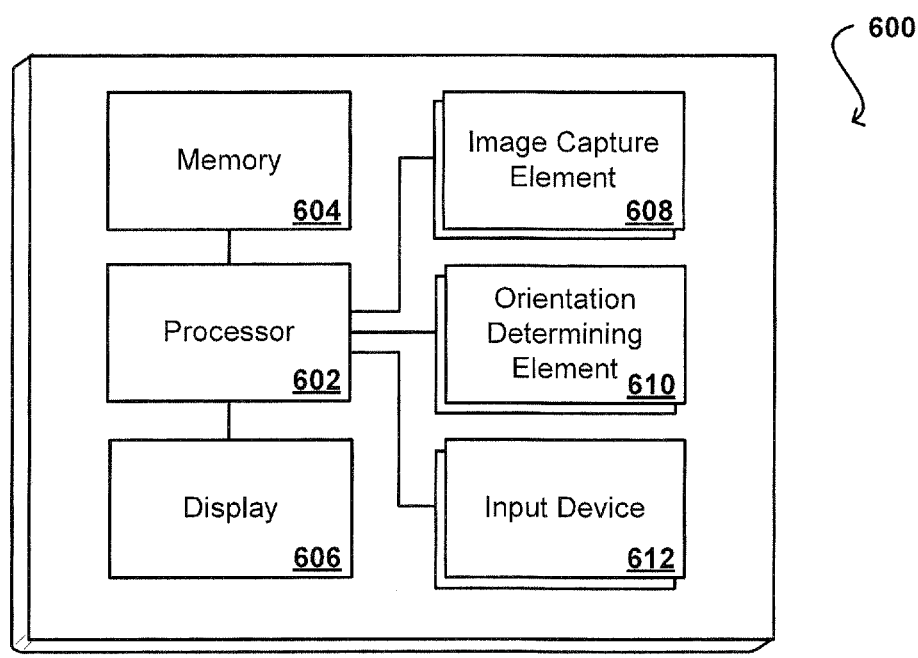
FIG. 6 illustrates example components of a computing device such as that illustrated in FIG. 5.

FIG. 6 illustrates a set of basic components of a computing device 600 such as the device 500 described with respect to FIG. 5. In this example, the device includes at least one processor 602 for executing instructions that can be stored in a memory device or element 604. As would be apparent to one of ordinary skill in the art, the device can include many types of memory, data storage or computer-readable media, such as a first data storage for program instructions for execution by the processor 602, the same or separate storage can be used for images or data, a removable memory can be available for sharing information with other devices, and any number of communication approaches can be available for sharing with other devices. The device typically will include some type of display element 606, such as a touch screen, electronic ink (e-ink), organic light emitting diode (OLED) or liquid crystal display (LCD), although devices such as portable media players might convey information via other means, such as through audio speakers. As discussed, the device in many embodiments will include at least two image capture elements 608, such as at least two cameras or detectors that are able to image a user, people, or objects in the vicinity of the device. It should be understood that image capture can be performed using a single image, multiple images, periodic imaging, continuous image capturing, image streaming, etc. The device also can include one or more orientation and/or location determining elements 610, such as an accelerometer, gyroscope, electronic compass, or GPS device as discussed above. These elements can be in communication with the processor in order to provide the processor with positioning, movement, and/or orientation data.

The device can include at least one additional input device 612 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

Figure 7:
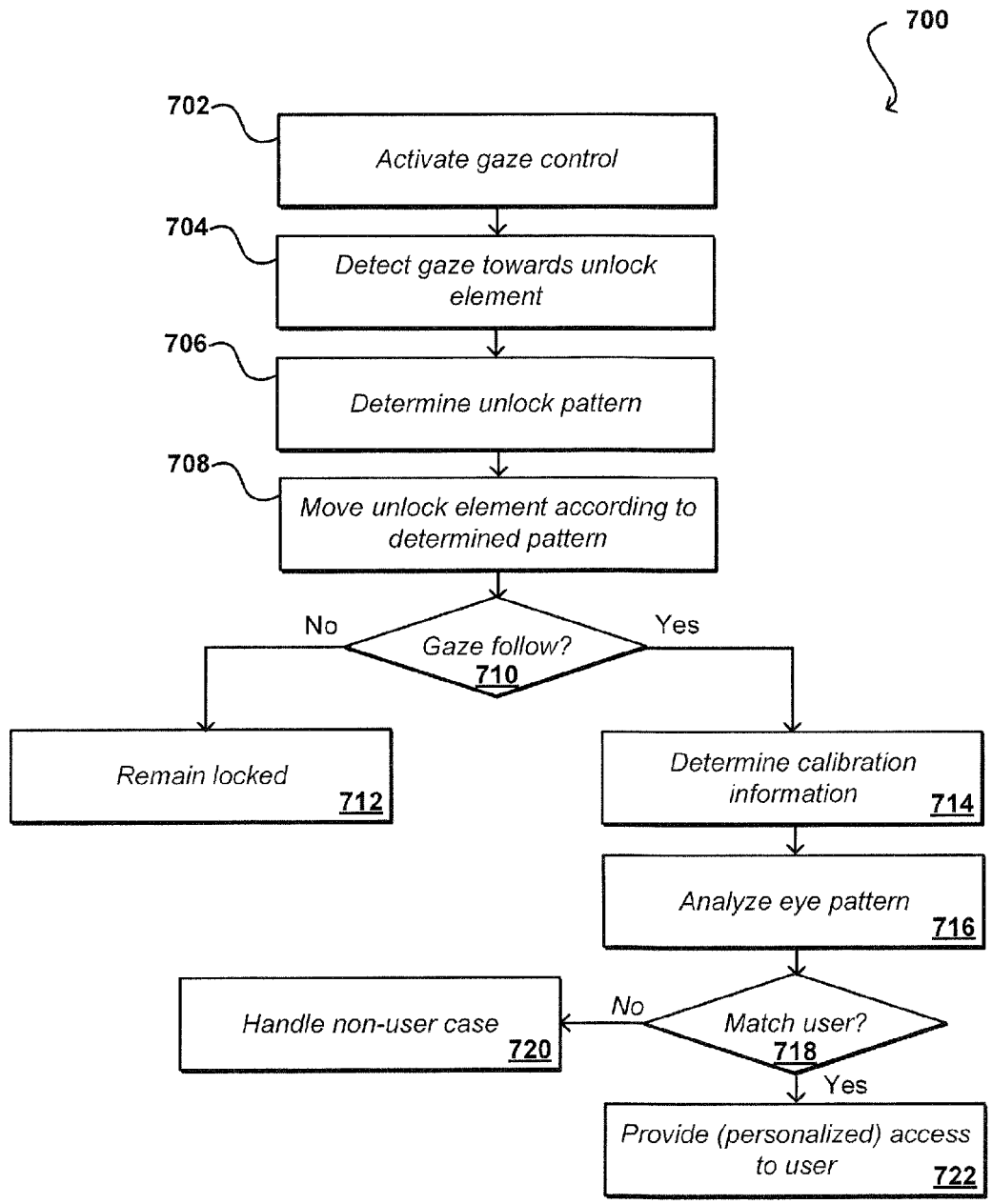
FIG. 7 illustrates an example process for secure unlocking and gaze calibration that can be used in accordance with various embodiments.

FIG. 7 illustrates an example of a process 700 for secure unlocking and gaze calibration that can be utilized in accordance with various embodiments. It should be understood that, for any process discussed herein, there can be additional, fewer, or alternative steps performed in similar or alternative orders, or in parallel, within the scope of the various embodiments unless otherwise stated. In this example, gaze tracking is activated on the device 702. In some embodiments a user must activate this mode manually, while in other modes the device can activate the mode whenever the user is locked and/or detected to be in a particular situation, such as when the device is determined to be held by a user, when the device is moved or a motion detector detects nearby movement, etc. Other modes of activation are possible as well. When gaze control is active, the device can capture image information around the device to attempt to locate a person nearby. If a person is detected, the device (or a system or service in communication with the device) can attempt to locate that user's eyes, and determine the viewing location and/or gaze direction of that person.

At a point when a person potentially wants to unlock or otherwise gain access to the device, the device will detect the user's gaze direction to likely be substantially toward the unlock element 704, or another location or position associated with the start of an unlock motion. In response to the detection of the gaze being towards an unlock element, or at another appropriate time, the device can select an unlock pattern to be used for the device 706. In at least some embodiments at least a portion of the pattern can be selected or determined ahead of time, such that the unlock element can be positioned appropriately on the display. In some embodiments, detecting the gaze being towards the device can cause other actions to be performed as well, such as to activate a display element, connect to a nearby network, or otherwise activate functionality or elements that might have been at least temporarily turned off or placed into a low power mode for resource savings or other such purposes.

When the user is determined to be gazing substantially at the position of the unlock element and at least a portion of the unlock pattern has been determined, the unlock element can be moved according to the determined pattern 708. It should be understood that similar approaches can be used as well, such as to display a fixed number of elements in specific locations where the user must look, flash items on a screen, etc. If the person's gaze does not follow the pattern 710 within an acceptable range of deviation, for example, then the device can remain locked 712. In at least some embodiments, the person can have other mechanisms for unlocking the device instead, such as by entering a passcode or using other approaches. If the person is unable to follow the pattern within an acceptable range of deviation, the person might be able to try again using the same or a different pattern. In at least some embodiments, a person will receive a maximum number of retry attempts, such as three times, after which the device cannot be unlocked for at least a minimum period of time.

If the gaze follows the unlock pattern within an acceptable range of deviation (e.g., within about 10% of the overall length of the pattern in distance) then the device can use the captured image information to determine calibration information for the user and the device under the current conditions 714 as discussed in more detail elsewhere herein. The device can also, at or around the time of the user gaze following at least a portion of the unlock pattern, analyze eye pattern information for the user from the captured image information 716. As discussed, this could be iris or retina information, for example. A matching process can be used to attempt to match the image information to a known and/or authorized user 718. If no match is located, a non-user case can be handled 720, such as where the person is not able to unlock the device or at least obtain certain functionality of the device. If a user match is located, and that user is authorized to access at least certain functionality on the device, that user can be provided with access (that might be personalized or limited) to the device 722. If at some point the device becomes locked again, or the device loses calibration, at least a portion of the process can be repeated as needed.

For example, a user might hand the device to another person. In some embodiments, the device might continue to allow access as long as the device is not locked, at which time the device can repeat the unlock and authentication process. In some embodiments, the motion of the device can cause the device to attempt to determine whether the gaze tracking needs to be recalibrated and/or whether another authentication should be done. In order to minimize possible annoyance to the user, the device might not be configured to require a re-authentication each time the device is moved a threshold amount. In some embodiments, the device can do a quick and/or low resolution check of identity to determine whether the person accessing the device is likely the expected user. For example, the device might have an ambient light camera that can capture an image of the user that can be analyzed using a simple recognition process to determine whether the person is likely the same user, based upon any of a number of factors such as clothing color, major dimensions or shapes, etc. If the person does not appear to be the same, or if the device does not utilize such a brief authentication process, for example, the device can attempt to capture and analyze the person's eye information using any of the processes discussed herein. In some cases the device does not need to have the person follow the unlock procedure again, but can instead capture image information of the user and analyze that information as long as the user is glancing sufficiently toward the device to capture the necessary information. If the person is the same user, the device can continue operation. If the person is a different user, or is unrecognized, the device can change operation or functionality as discussed elsewhere herein.

In some embodiments, the calibration portion might only be utilized when the device determines that calibration is necessary. For example, a device might instead unlock based upon the user gazing at the device and the device recognizing the user based upon the features of the user's eye(s). If the user is known and is at a typical relative orientation, the device might not need to have a separate calibration feature where the user follows an element or path with the user's gaze. The device might be able to utilize a predicted calibration, and perform any minor adjustments based upon subsequent user interaction. For example, if the user gazes at a button being selected on the device the device can make any minor adjustments needed to correlate that location with the user's gaze.

Such subtle approaches also can be used for other purposes as well. For example, a model or stored features of the user's eye can be updated over time based on newly captured and/or determined information, such as where features change as a child grows, without having the user go through a subsequent calibration or authentication process. Similarly, the user might not have to go through an initial authentication process. A user might enter identifying information on the device, such as to set up an account, and at the same time the device can capture eye information for the user. The eye information then can be automatically associated with that user without the user having to go through an eye capture and authentication process (although dedicated procedures to capture eye information can be used as well in various embodiments).

Figure 8A:
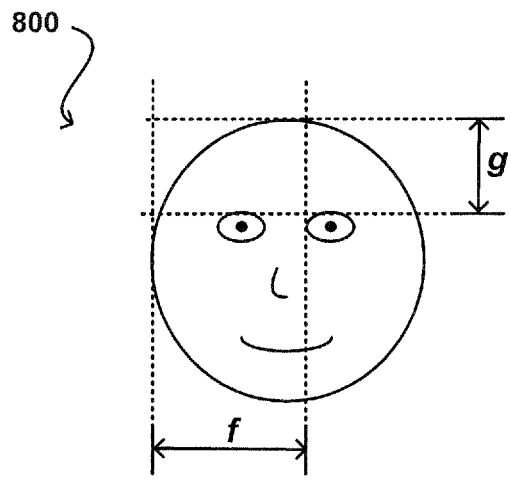
FIGS. 8(a)-8(c) illustrate example approaches to determining glance direction that can be used in accordance with various embodiments.
Figure 8A:
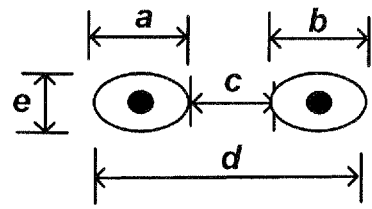
Figure 8B:
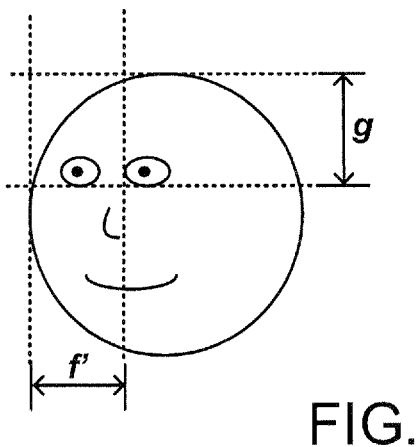
Figure 8B:
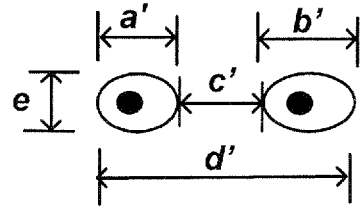
Figure 8C:
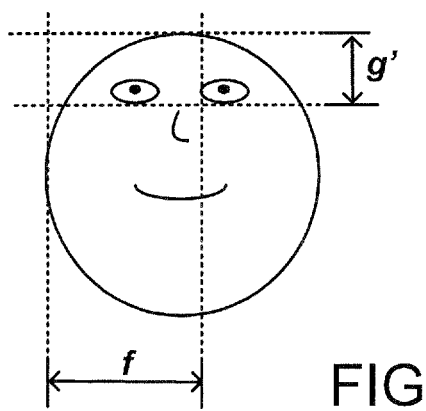
Figure 8C:
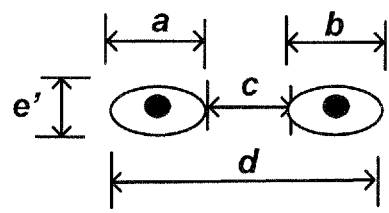

In order to determine the gaze direction of a user for such a process, the device in at least some embodiments has to determine the relative position of the user relative to the device, as well as dimensions or other aspects of the user at that position. FIG. 8(a) illustrates an example 800 wherein images are captured and analyzed to determine the relative positions of the user's head and the user's eyes. In a system wherein the algorithm is able to differentiate the user's pupils, the system can also utilize the relative position of the pupils with respect to the eye position. For example, FIG. 8(b) illustrates a case where the user is looking "left" (or to the user's right"), such that a center point of each user's pupil is to the left (in the image) of the center point of the respective eye. Similarly, FIG. 8(c) illustrates a case where the user is looking "up". As can be seen, the positions of the pupils have moved above a center point of the eyes. The position of the pupils can change without the user moving his or her head. Thus the system may be able to, in some embodiments, detect a glance without a change in head position. A system in accordance with one embodiment can take advantage of such information by adjusting the display of the computing device according to the detected position of the user's pupils relative to the user's eyes, and thus the determined area on the display at which the user is looking. A system can also detect movements such as a user closing his or her eyes for an extended period of time, wherein the device can perform an action such as placing an electronic book reader in a "sleep" or power-limiting mode, deactivating image capture, or powering off the device. A system in some embodiments can differentiate between different types of movement, such as between eye tremor, smooth tracking, and ballistic movements. In some embodiments, a user can provide specific input though various eye gestures, such as for a glance or gaze associated with a specific ballistic movement. A system could also require no ballistic movement in a continued gaze for certain input or actions, such as to enable a user to obtain additional information of the current type.

Figure 9A:
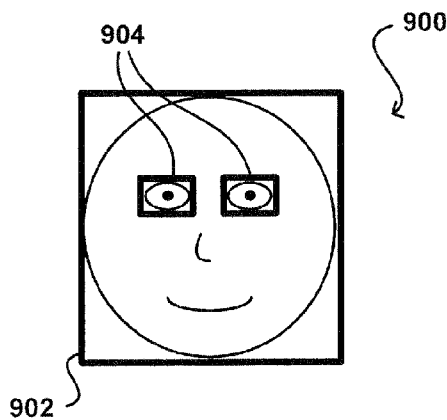
FIGS. 9(a)-9(f) illustrate example approaches to determining user input that can be used in accordance with various embodiments.

Various approaches can be utilized for locating one or more desired features of a user's face to determine various aspects useful for determining relative orientation. For example, if a user's head is to be used as input, there can be many objects that can be shaped similar to a human head that could give false readings. Also, a user nodding "no" might not actually move the position of the user's head enough to register the movement. Accordingly, various approaches utilize features such as a user's eyes to assist in position and movement determination. For example, an image can be analyzed to determine the approximate location and size of a user's head or face. FIG. 9(a) illustrates an example wherein the approximate position and area of a user's head or face 900 is determined and a virtual "box" 902 is placed around the face as an indication of position using one of a plurality of image analysis algorithms for making such a determination. Using one algorithm, a virtual "box" is placed around a user's face and the position and/or size of this box is continually updated and monitored in order to monitor relative user position. Similar algorithms can also be used to determine an approximate location and area 904 of each of the user's eyes (or in some cases the eyes in tandem). By determining the location of the user's eyes as well, advantages can be obtained as it can be more likely that the image determined to be the user's head actually includes the user's head, and it can be determined that the user is facing the device. Further, the relative movement of the user's eyes can be easier to detect than the overall movement of the user's head when performing motions such as nodding or shaking the head back and forth.

Figure 9B:
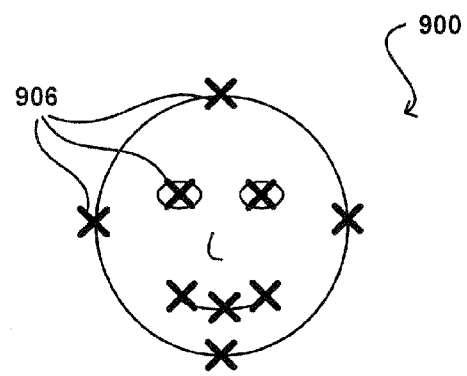

Various other algorithms can be used to determine the location of features on a user's face. For example, FIG. 9(b) illustrates an example wherein various features on a user's face are identified and assigned a point location 906 in the image. The system thus can detect various aspects of user features and can determine changes such as movement or change in shape or expression. Such an approach provides advantages over the general approach of FIG. 9(a) in certain situations, as various points along a feature can be determined, such as the end points and at least one center point of a user's mouth. Accordingly, expressions such as a smile or frown can be captured even though the overall position of the user's mouth or face did not move.

Figure 9C:
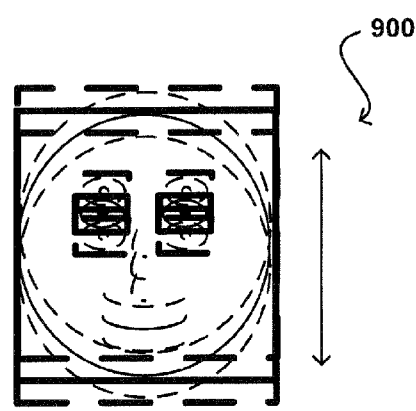
Figure 9D:
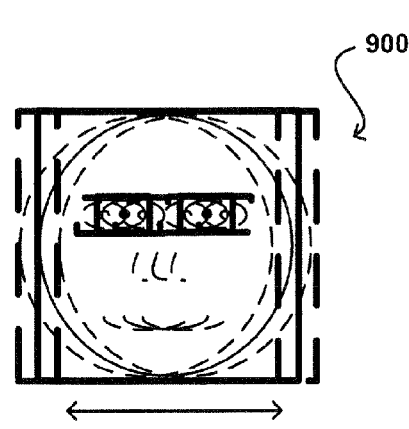
Figure 9E:
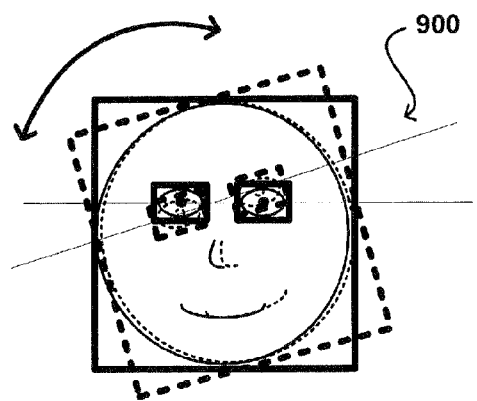

Once the positions of facial features of a user are identified, relative motion between the user and the device can be detected and utilized as input. For example, FIG. 9(c) illustrates an example where the user's head 900 is moving up and down with respect to the viewable area of the imaging element. As discussed, this could be the result of the user shaking his or her head, or the user moving the device up and down, etc. FIG. 9(d) illustrates a similar example wherein the user is moving right to left relative to the device, through movement of the user, the device, or both. As can be seen, each movement can be tracked as a vertical or horizontal movement, respectively, and each can be treated differently as an input to perform a specified function. In one example, the monitored movements are used to control the position of a cursor on the interface display by following the up, down, and across motions. As should be understood, such a process also can detect diagonal or other such movements. FIG. 9(c) further illustrates an example wherein the user tilts the device and/or the user's head, and the relative change in eye position is detected as a rotation. In some systems, a "line" that corresponds to the relative position of the eyes can be monitored, and a shift in angle of this line can be compared to an angle threshold to determine when the rotation should be interpreted as input.

Figure 9F:
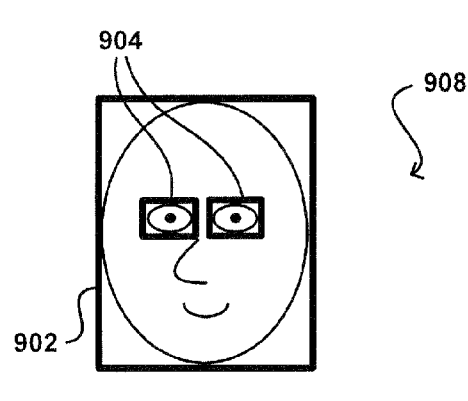

FIG. 9(f) illustrates another advantage of using an approach such as that described with respect to FIG. 9(b) to determine the position of various features on a user's face. In this exaggerated example, it can be seen that the features of a second user's head 1108 have a different relative position and separation. Thus, the device also can not only determine positions of features for a user, but can distinguish between different users. As discussed later herein, this can allow the device to perform differently for inputs from different users. Also, the device can be configured to detect how close a user is to the device based on, for example, the amount and ratio of separation of various features, such that the device can detect movement towards, and away from, the device. This can help to improve the accuracy of gaze detection.

In some embodiments, a computing device can determine and track an approximate area or region of interest corresponding to the user's eyes, or another such feature, in the captured images such that an algorithm of the computing device only has to analyze image data corresponding to that region, which can significantly reduce the amount of processing needed for images, particularly for high resolution, full color images.

In at least some embodiments, a device is able to distinguish between movement of the user and movement of the device, such as by detecting movement of a background or other aspect of the images, by analyzing the separation, shape or size of various features, or using movement sensing elements such as an accelerometer. Thus, in embodiments described herein that use the image capture element to determine an orientation or location of the device relative to its user, a user can have an option of inputting a given type of motion which corresponds to a specific command by moving the device, altering an aspect of the user or both. Further, the direction of audio capture can be adjusted based at least upon the determined action, such as a tilting of the device as measured by an accelerometer or gyroscope, to improve upon the precision of the image analysis.

In some embodiments, a device can attempt to determine information about a glint or reflection of a user's eye in addition to pupil or iris information. In some embodiments where a high resolution camera enables precise determinations to be made, the center point of a glint and a pupil can be used to generate a three-dimensional model of the user's eye. A center of focus determination can be made using the model and the captured image information, enabling the device to accurately determine gaze direction based on the glint and pupil information. By maintaining such a model, the number of calibration points needed can be reduced. In one embodiment, four points near the center of a display may be sufficient, as opposed to points at the full width and length for other embodiments. The number and arrangement of calibration points can vary, depending at least in part upon the algorithm or technique used. In some embodiments, there are diminishing returns to adding additional points, as the accuracy of the calibration is not significantly improved for the amount of additional processing.

A number of other approaches can be used as well within the scope of the various embodiments. For example, thermal imaging or another such approach could be used to attempt to determine and track the position of at least some aspect of a human user. In many instances the imaging system is desired to be small and inexpensive enough for mass marketing, such that simple or conventional imaging approaches and components can be preferred. Certain existing cameras can detect infrared radiation, but typically utilize an IR filter. Utilizing these cameras without the IR filter, and potentially with an ambient light filter, can allow these relatively inexpensive cameras to be used as IR detectors.

As discussed, a single wavelength of infrared radiation can be used in various embodiments to capture eye information for a user. In other embodiments, at least two different wavelengths are used to capture image information in order to get more information about the user, as well as to make it harder to fool the recognition process. In one embodiment, a single detector is used to detect radiation reflected at two different wavelengths. As an example, a first LED could emit radiation at a wavelength (e.g., 940 nm) that is reflected by the retina, and a second LED could emit radiation at a wavelength (e.g., 1100 nm) that is absorbed by the cornea and/or other portions of the human eye. Specific wavelengths can be selected within selected wavelength ranges, based at least in part upon their reflective properties with respect to the human eye. For example, experiments indicate that light has less than a 50% absorption rate (for the typical human eye) under about 940 nm, above 50% absorption between about 940 nm and about 1030 nm, around 50% absorption for wavelengths between about 1040 nm and about 1100 nm, and about 100% absorption at 1150 nm and above. Thus, emitters can be selected that fall within at least some of these ranges, such as a first IR emitter that has significantly less that 50% absorption and a second IR emitter that has significantly greater than 50% absorption. The specific wavelengths can further be based, in at least some embodiments, upon the wavelengths of available devices. For example, an available laser diode at 904 nm can be selected that has a relatively low absorption rate, and an available laser diode at 980 nm or 1064 nm can be selected that has a relatively high absorption rate. In some embodiments, the power output of the higher wavelength diode can be scaled up to substantially match the perceived brightness of the lower wavelength diode by a CMOS sensor (or other such detector), the sensitivity of which might fall off to around zero at a value of about 1100 nm, such that in at least one embodiment the two emitters have wavelengths of 910 nm and 970 nm).

An advantage to using two wavelengths is that the LEDs can emit the radiation simultaneously, as long as a resulting image is able to be decomposed in order to extract image information corresponding to each wavelength. Various approaches for decomposing such an image are discussed elsewhere herein. The LEDs then could both be positioned near the camera, or a single LED or emitter can be used near the camera if that LED operates at (at least) the two frequencies of interest. Further information about the use of multiple emitters, detectors, and/or wavelengths can be found, for example, in co-pending U.S. patent application Ser. No. 12/786,297, filed May 24, 2010, entitled "Determining Relative Motion as Input," which is hereby incorporated herein by reference for all purposes.

When performing iris recognition, for example, a device might utilize IR in the 750 nm-950 nm range in order to avoid light reflections from the cornea, which can potentially create noise in the captured image information. A second wavelength might be used to determine relative absorption to ensure the image information corresponds to a human eye, as discussed above. In one example, the eye location of a user can be located using any appropriate process, such as those discussed above with respect to FIGS. 9(a)-9(f). The ability to locate the eye region enables the more complex iris recognition processing to be performed on a smaller data set, thus reducing the amount of resources needed and producing faster results.

Figure 10:
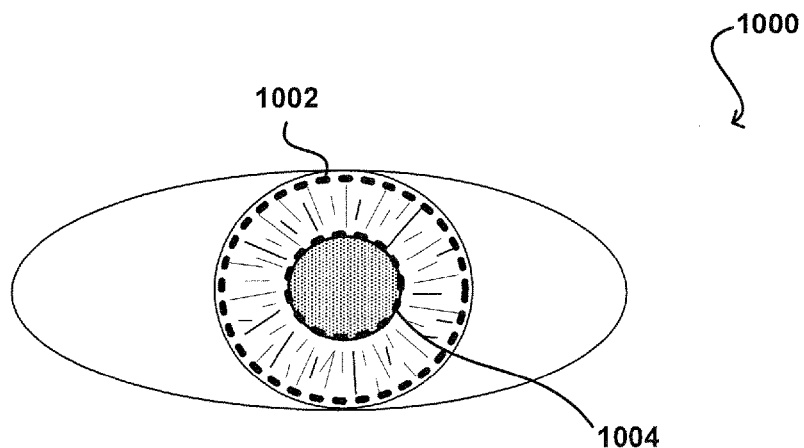
FIG. 10 illustrates a first portion of an example technique for performing iris recognition that can be used in accordance with various embodiments.

In one example process, the captured image information is analyzed to locate the region of interest, in this example the iris region of the user. FIG. 10 illustrates an example of information captured for a human eye 1000, where the basic shape of the eye is utilized to locate an approximate outer boundary 1002 and inner boundary 1004 of the eye. In some embodiments this will be done for only one of the user's eyes, to reduce processing requirements and increase the recognition speed, while in other embodiments both eyes might be analyzed for improved accuracy, as may be needed for more secure applications. In some embodiments, the information captured for a second eye will only be analyzed if the results for the first eye are inconclusive or if there is a problem with the analysis of the first eye, etc. Various algorithms or settings can be used to determine which eye to analyze, such as may be based upon lighting, relative angle, etc.

Figure 11A:
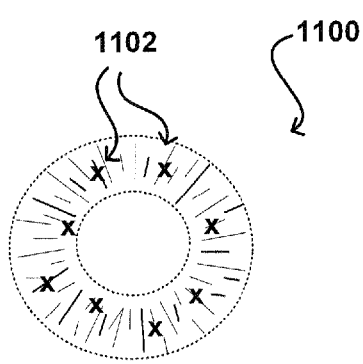
FIGS. 11(a) and 11(b) illustrate possible second portions of an example technique for performing iris recognition that can be used in accordance with various embodiments.
Figure 11B:
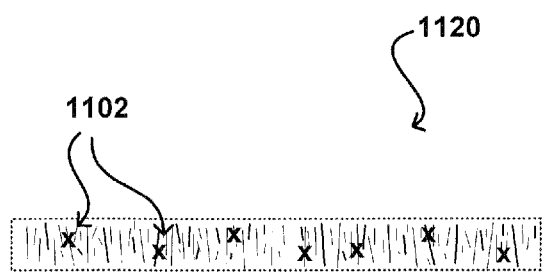

Once the portion of the image corresponding to the iris is identified, a matching or feature location process can be used to attempt to identity the user. In FIG. 11(a), for example, unique or distinctive features 1102 of the iris can be determined using any appropriate biometric feature determination process known or used for such purposes. In other processes, an image matching process might be used to instead attempt to identify the user, but such image matching can be relatively processor and/or memory intensive such that it can be desirable for certain devices, such as portable devices, to instead attempt to identify unique features, which then instead enables the device to match based upon a relatively small set of data points. FIG. 11(b) illustrates another example of iris information 1120 wherein the iris information is adjusted to a substantially linear set of feature points, which can simplify the matching in at least some embodiments while still providing acceptably reliable results.

In some embodiments, the electronic device can store matching information for each user of that device, such that the matching and/or authentication process can be performed on the device. In other embodiments, the image and/or feature information can be sent to a remote location, such as a remote system or service, for processing.

Figure 12:
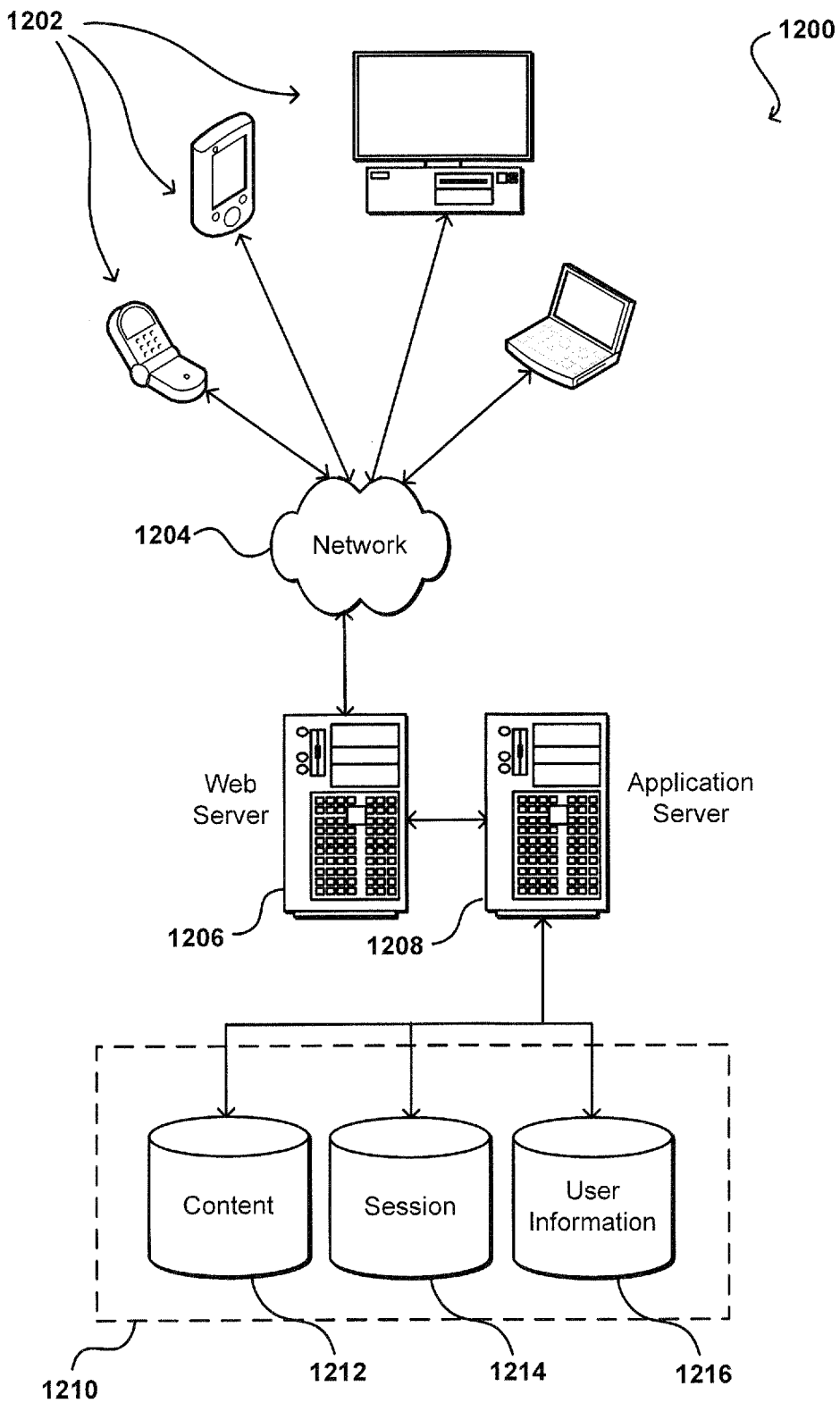
FIG. 12 illustrates an environment in which various embodiments can be implemented.

As discussed, different approaches can be implemented in various environments in accordance with the described embodiments. For example, FIG. 12 illustrates an example of an environment 1200 for implementing aspects in accordance with various embodiments. As will be appreciated, although a Web-based environment is used for purposes of explanation, different environments may be used, as appropriate, to implement various embodiments. The system includes an electronic client device 1202, which can include any appropriate device operable to send and receive requests, messages or information over an appropriate network 1204 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1206 for receiving requests and serving content in response thereto, although for other networks, an alternative device serving a similar purpose could be used, as would be apparent to one of ordinary skill in the art.

The illustrative environment includes at least one application server 1208 and a data store 1210. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 1208 can include any appropriate hardware and software for integrating with the data store 1210 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 1206 in the form of HTML, XML or another appropriate structured language in this example. The handling of all requests and responses, as well as the delivery of content between the client device 1202 and the application server 1208, can be handled by the Web server 1206. It should be understood that the Web and application servers are not required and are merely example components, as structured code discussed herein can be executed on any appropriate device or host machine as discussed elsewhere herein.

The data store 1210 can include several separate data tables, databases or other data storage mechanisms and media for storing data relating to a particular aspect. For example, the data store illustrated includes mechanisms for storing content (e.g., production data) 1212 and user information 1216, which can be used to serve content for the production side. The data store is also shown to include a mechanism for storing log or session data 1214. It should be understood that there can be many other aspects that may need to be stored in the data store, such as page image information and access rights information, which can be stored in any of the above listed mechanisms as appropriate or in additional mechanisms in the data store 1210. The data store 1210 is operable, through logic associated therewith, to receive instructions from the application server 1208 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 1202. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 12. Thus, the depiction of the system 1200 in FIG. 12 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGT servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing device, comprising:
   one or more processors;
   a display screen;
   one or more infrared (IR) radiation emitters;
   a camera;
   a memory device including instructions, which when executed by the one or more processors, cause the computing device to:
     generate a path along which a user is to follow via a gaze of the user;
     display a graphical element on the display screen at a starting point along the path;
     emit first IR radiation, using the one or more IR radiation emitters, having a first wavelength;
     emit second IR radiation, using the one or more IR radiation emitters, having a second wavelength;

capture first image data using the camera;

determine, from the first image data, first decomposed image data corresponding to the first wavelength;

determine, from the first decomposed image data, a first boundary of an eye of the user;

determine, from the first image data, second decomposed image data corresponding to the second wavelength;

determine, from the second decomposed image data, a second boundary of the eye of the user;

detect, using the first boundary determined from the first decomposed image data, the second boundary determined from the second decomposed image data, and the first image data, a vector corresponding to the gaze of the user intersecting the starting point;

prompt the user to follow the graphical element via the gaze of the user;

move the graphical element between the starting point and an endpoint along the path;

capture second image data using the camera;

determine, from the second image data, third decomposed image data corresponding to the first wavelength;

determine, from the third decomposed image data, the first boundary of the eye of the user;

determine, from the second image data, fourth decomposed image data corresponding to the second wavelength;

determine, from the fourth decomposed image data, the second boundary of the eye of the user;

track, using the first boundary determined from the third decomposed image data, the second boundary determined from the fourth decomposed image data, and the second image data, the gaze of the user with respect to the display screen during movement of the graphical element between the starting point and the endpoint;

determine that the gaze of the user followed the path within a predetermined range of deviation; and provide the user with access to at least some functionality of the computing device.

2. The computing device of claim 1, wherein the instructions, which when executed by the one or more processors, further cause the computing device to:

determine, using the first boundary determined from the third decomposed image data, the second boundary determined from the fourth decomposed image data, and the second image data, that the user is an authorized user of the computing device; and provide the user with access to content or additional functionality of the computing device that is personalized for the authorized user.

3. The computing device of claim 1, wherein the instructions, which when executed by the one or more processors, further cause the computing device to:

determine, using the first boundary determined from the third decomposed image data, the second boundary determined from the fourth decomposed image data, and the second image data, calibration information for performing gaze tracking, wherein the calibration information is determined within an allowable time period from when it is determined that the gaze of the user followed the path within the predetermined range of deviation.

4. A computer-implemented method for providing access to a computing device, comprising:

displaying a graphical element, on a display screen of the computing device, moving along a path;

emitting first IR radiation having a first wavelength;

emitting second IR radiation having a second wavelength;

capturing image data;

determining, from the image data, first decomposed image data corresponding to the first wavelength;

determining, from the image data, second decomposed image data corresponding to the second wavelength;

tracking, based at least in part on the first decomposed image data, the second decomposed image data, and the image data, a gaze of a user;

determining that the gaze of the user followed the path within a predetermined range of deviation; and providing the user with access to at least some functionality of the computing device.

5. The computer-implemented method of claim 4, further comprising at least one of:

dynamically generating the path;

selecting the path from a rotation comprising a plurality of predetermined paths; or randomly selecting the path from among the plurality of predetermined paths.

6. The computer-implemented method of claim 4, wherein the path includes at least one first segment that is substantially a height of the display screen and at least one second segment that is substantially a width of the display screen.

7. The computer-implemented method of claim 4, further comprising:

detecting, using the first decomposed image data, the second decomposed image data, and the image data, a vector corresponding to the gaze of the user intersecting a starting point along the path;

prompting the user to follow the graphical element via the gaze of the user; and moving the graphical element between the starting point and an endpoint along the path.

8. The computer-implemented method of claim 4, further comprising:

determining, using the first decomposed image data, the second decomposed image data, the image data, and data stored for one or more authorized users of the computing device, that the user is a specific authorized user of the computing device.

9. The computer-implemented method of claim 8, further comprising:

providing the user with access to content or additional functionality of the computing device that is personalized for the specific authorized user.

10. The computer-implemented method of claim 4 further comprising:

determining, using the first decomposed image data, the second decomposed image data, the image data, and data stored for one or more authorized users of the computing device, that the user is not a specific authorized user of the computing device; and disabling access to content or additional functionality of the computing device that is personalized for the specific authorized user.

11. The computer-implemented method of claim 8, wherein determining that the user is the specific authorized user includes:

matching one or more features within the image data to one or more respective features within the data stored for the one or more authorized users.

12. The computer-implemented method of claim 8, wherein determining that the user is the specific authorized user includes:
performing at least one of iris recognition or retina recognition using the first decomposed image data, the second decomposed image data, the image data, and the data stored for the one or more authorized users.

13. The computer-implemented method of claim 8, wherein determining that the user is the specific authorized user includes:
determining, using the first decomposed image data, the second decomposed image data, the image data, and absorption response information, that the image data includes a representation of at least one human eye.

14. The computer-implemented method of claim 4,
determining, using the first decomposed image data, the second decomposed image data, and the image data, calibration information for performing gaze tracking,
wherein the calibration information is determined within an allowable time period from when it is determined that the gaze of the user followed the path within the predetermined range of deviation.

15. The computer-implemented method of claim 4, wherein movement of the graphical element includes a first velocity along a first segment of the path that varies from a second velocity along a second segment of the path.

16. The computer-implemented method of claim 4, wherein movement of the graphical element includes a first pause for a first period of time at a first point of the path that varies from a second pause for a second period of time at a second point of the path.

17. A non-transitory computer-readable storage medium storing instructions for providing access to a computing device, the instructions, which when executed by one or more processors of the computing device, cause the computing device to:
determine a path along which a user is to follow via a gaze of the user;
display a graphical element, on a display screen of the computing device, moving along the path;
emit first IR radiation having a first wavelength;
emit second IR radiation having a second wavelength;
capture image data;
determine, from the image data, first decomposed image data corresponding to the first wavelength;
determine, from the image data, second decomposed image data corresponding to the second wavelength;
track, based at least in part on the first decomposed image data, the second decomposed image data, and the image data, the gaze of the user;
determine that the gaze of the user followed the path within a predetermined range of deviation; and
provide the user with access to at least some functionality of the computing device.

18. The non-transitory computer-readable storage medium of claim 17, wherein the instructions, which when executed by the one or more processors of the computing device, further cause the computing device to:
determine using the first decomposed image data, the second decomposed image data, the image data, and data stored for one or more authorized users of the computing device, that the user is a specific authorized user of the computing device; and
provide the user with access to content or additional functionality of the computing device that is personalized for the specific authorized user.

19. The non-transitory computer-readable storage medium of claim 18, wherein the instructions, which when executed by the one or more processors of the computing device, further cause the computing device to perform at least one of:
match one or more features within the image data to one or more respective features within the data stored for the one or more authorized users;
perform at least one of iris recognition or retina recognition using the first decomposed image data, the second decomposed image data, the image data, and the data stored for the one or more authorized users; or
determine, using the first decomposed image data, the second decomposed image data, the image data, and absorption response information, that the image data includes a representation of at least one human eye.

20. The non-transitory computer-readable storage medium of claim 17, wherein the instructions, which when executed by the one or more processors of the computing device, further cause the computing device to:
determine, using the first decomposed image data, the second decomposed image data, the image data, and data stored for one or more authorized users of the computing device, that the user is not a specific authorized user of the computing device; and
disable access to content or additional functionality of the computing device that is personalized for the specific authorized user.

* * * * *